United States Patent
Song et al.

(10) Patent No.: US 7,241,224 B2
(45) Date of Patent: Jul. 10, 2007

(54) TORSIONAL VIBRATION DAMPER

(75) Inventors: Young Rae Song, Seoul (KR); Tae Han Jee, Suwon (KR); Jae Hoon Jung, Seongnam (KR)

(73) Assignee: Hyundai Motor Company, Seoul (KR)

( * ) Notice: Subject to any disclaimer, the term of this patent is extended or adjusted under 35 U.S.C. 154(b) by 235 days.

(21) Appl. No.: 11/028,280

(22) Filed: Dec. 30, 2004

(65) Prior Publication Data

US 2006/0009295 A1   Jan. 12, 2006

(30) Foreign Application Priority Data

Jul. 6, 2004   (KR) ..................... 10-2004-0052439

(51) Int. Cl.
*F16D 3/00* (2006.01)
*F16D 3/14* (2006.01)

(52) U.S. Cl. .................. 464/64.1; 464/68.1; 464/68.9; 464/68.92; 192/212

(58) Field of Classification Search ............... 464/64.1, 464/68.1, 68.9, 68.92; 192/212
See application file for complete search history.

(56) References Cited

U.S. PATENT DOCUMENTS

| 3,296,887 | A | * | 1/1967 | Larsen | ...................... 464/68.4 |
|---|---|---|---|---|---|
| 3,754,413 | A | * | 8/1973 | Borrini | ...................... 464/68.1 |
| 4,572,339 | A | * | 2/1986 | Koshimo | .................. 464/68.92 |
| 4,702,721 | A | * | 10/1987 | Lamarche | .................. 464/68.1 |
| 5,996,761 | A | * | 12/1999 | Teramae | ..................... 464/67.1 |
| 6,106,400 | A | * | 8/2000 | Mizukami | ................ 464/68.92 |
| 6,364,776 | B1 | * | 4/2002 | Young | ....................... 464/68.1 |

FOREIGN PATENT DOCUMENTS

| DE | 10216289 A1 | 1/2003 |
|---|---|---|
| KR | 10-2003-0081678 | 10/2003 |
| KR | 10-2004-0037781 | 5/2004 |

* cited by examiner

*Primary Examiner*—Daniel P. Stodola
*Assistant Examiner*—Victor MacArthur
(74) *Attorney, Agent, or Firm*—Morgan Lewis & Bockius LLP

(57) ABSTRACT

A torsional vibration damper includes a primary mass defining a ring-shaped chamber, a secondary mass relatively rotatably connected to the primary mass, and a damping unit for coupling the primary and secondary masses to each other in a rotationally elastic manner. The damping unit comprises a plurality of coil springs, a pair of end guides, and a friction member slidably disposed between neighboring coil springs. The friction member is configured to be rubbed against at least one of an inner wall and an outer wall of the ring-shaped chamber in response to compressions of the coil springs such that a friction force is generated in proportion to a relative rotation between the primary and secondary masses as well as to a rotational speed thereof.

14 Claims, 9 Drawing Sheets

TORSIONAL VIBRATION DAMPER

CROSS REFERENCE TO RELATED APPLICATION

This application claims priority to Korean Application No. 10-2004-0052439, filed on Jul. 6, 2004, the disclosure of which is incorporated herein by reference.

FIELD OF THE INVENTION

The present invention relates to a torsional vibration damper for a vehicle.

BACKGROUND OF THE INVENTION

A torsional vibration damper, i.e., a dual mass flywheel, is generally used for damping a torsional vibration that is generated from the transmission of power between an output shaft of an engine and an input shaft of a transmission. Typically, torsional vibration dampers include a first mass, a second mass, and a damping unit disposed between the first and second masses. The first mass is connected to the output shaft of the engine, and the second mass is connected to the input shaft of the transmission through a clutch mechanism. The first and second masses are connected to each other through the damping unit such that the first and second masses can rotate relative to each other.

Generally, the engine of a vehicle provides the driving force distributed to the wheels of the vehicle. However, at times the engine may be driven by an inertia force of the vehicle. Therefore, the first and second masses must be designed to rotate in both directions relative to each other.

When engine torque is substantially high and the vehicle is driven with a specific gear ratio, relative rotation between the first and second masses reaches a limit. Furthermore, when the engine torque changes irregularly, the first and second masses may be dashed against a member for limiting the relative rotation of the first and second masses.

To solve such problems, the flywheel is generally designed to have a high level of damping characteristics. In the prior flywheel, when the relative rotation between the first and second masses occurs, the magnitude of torque cannot be regulated. Furthermore, the damping effect of the flywheel is almost constant even when the relative rotation between the first and second masses occurs.

To solve such problems, a flywheel, having a pair of wedge-shaped friction elements that generate a friction force in proportion to the amount of relative rotation between the masses, and a concentrated mass type friction element, which generates a friction force in proportion to the centrifugal force, i.e., rotation speed, has been developed.

However, in a conventional flywheel, the wedge-shaped friction element and the concentrated mass type friction element independently operate, and this makes it difficult to achieve a precise tuning of the damping effect. Additionally, due to friction between the pair of wedge-shaped friction elements, a desired friction cannot be obtained.

The information disclosed in this Background of the Invention section is only for enhancement of understanding of the background of the invention and should not be taken as an acknowledgement or any form of suggestion that this information forms the prior art that is already known to a person skilled in the art.

SUMMARY OF THE INVENTION

EMBODIMENTS OF THE PRESENT INVENTION provide a torsional vibration damper in which damping in proportion to relative rotation between the primary and secondary masses, as well as to a rotational speed thereof, can be obtained.

An exemplary torsional vibration damper according to an embodiment of the present invention, comprises: a primary mass adapted to be coupled to an engine crankshaft for rotation about a rotational axis of the engine crankshaft, the primary mass defining a substantially ring-shaped chamber that is divided into at least two portions; a secondary mass relatively rotatably connected to the primary mass and connectable with a clutch; and a damping unit for coupling the primary and secondary masses to each other in a rotationally elastic manner. The damping unit may comprise: a plurality of coil springs situated in series and disposed one after the other within the divided portions of the ring-shaped chamber; a pair of end guides slidably disposed within each divided portion of the ring-shaped chamber and supporting the outer ends of the coil springs among the plurality of elastic members; and a friction member slidably disposed between neighboring coil springs and configured to be rubbed against at least one of an inner wall and an outer wall of the ring-shaped chamber in response to compressions of the coil springs such that a friction force is generated in proportion to a relative rotation between the primary and secondary masses, as well as to a rotational speed thereof.

The friction member may include: a concentrated mass; an outer wedge-shaped friction guide elastically supported by one of the neighboring coil springs toward the concentrated mass and provided with a first slanted surface contacting the concentrated mass at one end thereof; and an inner wedge-shaped friction guide elastically supported by the other of the neighboring coil springs toward the concentrated mass and provided with a second slanted surface contacting the concentrated mass at one end thereof.

The concentrated mass may have a cylindrical shape such that, in response to compressions of the coil springs, the outer wedge-shaped friction guide moves in an outwardly radial direction of the primary mass while maintaining a linear contact with the concentrated mass, and the inner wedge-shaped friction guide moves in an inwardly radial direction of the primary mass while maintaining a linear contact with the concentrated mass.

The outer and inner wedge-shaped friction guides may be provided respectively with a first curved surface and a second curved surface, and the concentrated mass may be disposed between the first and second curved surfaces to contact the first and second slanted surfaces.

The first curved surface may be provided at an outer end of the outer wedge-shaped friction guide and the second curved surface may be provided at an inner end of the inner wedge-shaped friction guide.

The concentrated mass may be made of material having a density greater than a density of material of the outer and inner wedge-shaped friction guides. Furthermore, the outer and inner wedge-shaped friction guides may be made of plastic material and the concentrated mass may be made of metal.

A mean operating radius of the outer wedge-shaped friction guide may be greater than a mean operating radius of the inner wedge-shaped friction guide.

A first coil spring receiving hole may be formed at one end of the outer wedge-shaped friction guide into which at least a portion of the coil spring is inserted, and a second coil spring receiving hole is formed at one end of the inner wedge-shaped friction guide into which at least a portion of the coil spring is inserted. Bottom surfaces of the first and second coil spring receiving holes may be respectively slanted by a predetermined angle with respect to end surfaces of the coil springs.

Each of the bottom surfaces of the first and second coil spring receiving holes may be slanted such that an outer end portion of the end surface of the coil spring contacts the bottom surface and an inner end portion of the end surface of the coil spring does not contact the bottom surface in a state in which there is no relative rotation between the primary and secondary masses.

A first groove may be formed in a circumferential direction of the ring-shaped chamber on at least one of the outer surfaces of the outer and inner wedge-shaped friction guides.

A second groove may be formed in a direction substantially perpendicular to the circumferential direction of the ring-shaped chamber on at least one of the outer surfaces of the outer and inner wedge-shaped friction guides.

A lubrication oil passage may be formed between the divided portions of the ring-shaped chamber.

A coil spring receiving hole into which at least a portion of the coil spring is inserted may be formed at one end of each end guide, and a bottom surface of the coil spring receiving hole may be slanted by a predetermined angle with respect to an end surface of the coil spring.

The bottom surface of the coil spring receiving hole may be slanted such that an outer end portion of an end surface of the coil spring contacts the bottom surface and an inner end portion of the end surface of the coil spring does not contact the bottom surface in a state in which there is no relative rotation between the primary and secondary masses.

A first groove may be formed in a circumferential direction of the ring-shaped chamber on an outer surface of the end guide.

A second groove may be formed in a direction substantially perpendicular to the circumferential direction of the ring-shaped chamber on the outer surface of the end guide.

A torsional vibration damper may further include a drive plate that is coupled to the secondary mass and configured to compress the damping unit when a relative rotation between the primary and secondary masses occurs.

A plurality of compression fins may be formed on an outer circumference of the drive plate, and wherein, the widths of the compression fins differ from each other.

BRIEF DESCRIPTION OF THE DRAWINGS

The accompanying drawings illustrate exemplary embodiments of the present invention, and, together with the description, serve to explain the principles of the present invention, where.

DETAILED DESCRIPTION OF THE EMBODIMENTS

Hereinafter, an embodiment of the present invention will be described in detail with reference to the accompanying drawings.

A torsional vibration damper 10 according to an embodiment of the present invention may be disposed between an engine and a transmission, and functions to damper torsional vibration that is generated during power transmission. The torsional vibration damper 10 can be used between any power transmission portion, in addition to between the engine and the transmission.

Figure 1:
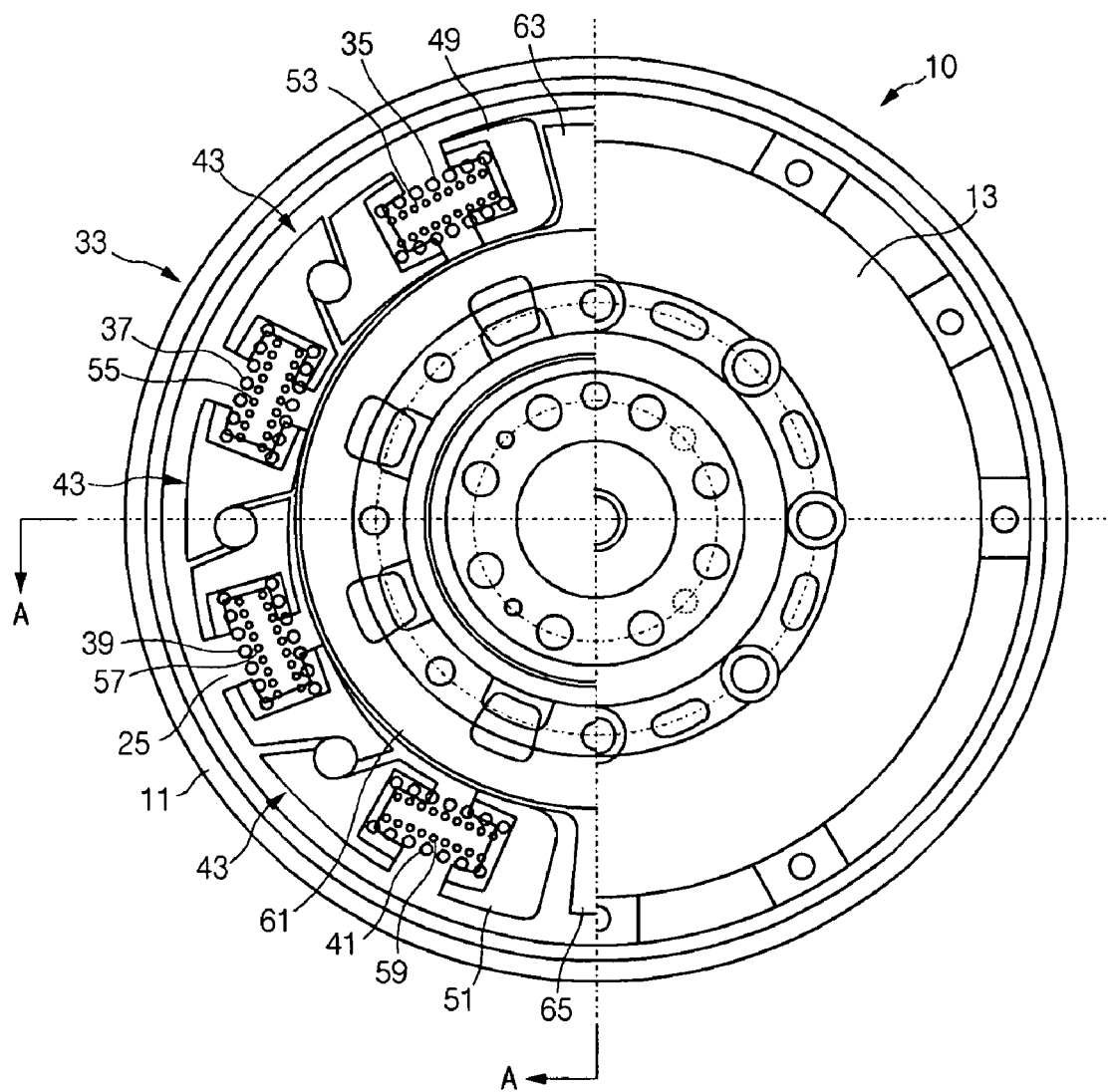
FIG. 1 is a partially broken-away plan view showing an inner structure of a torsional vibration damper according to an embodiment of the present invention.
Figure 2:
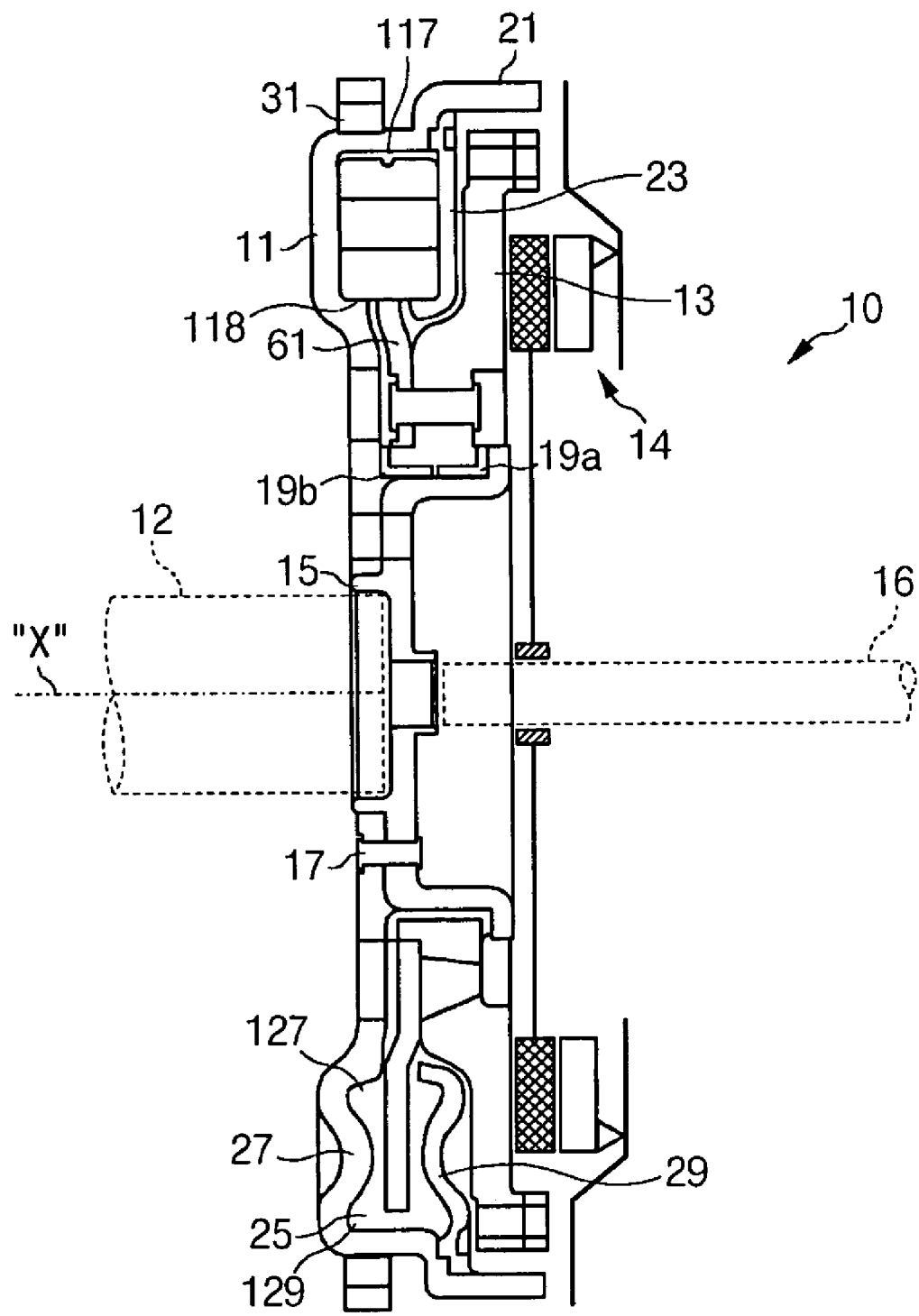
FIG. 2 is a sectional view approximately along line A-A in FIG. 1.

Referring to FIGS. 1 and 2, a primary mass 11 is adapted to be coupled to an engine crankshaft 12 for rotation about a rotational axis "X" of the engine crankshaft 12. A secondary mass 13 is relatively rotatably connected to the primary mass 11 and is configured to be connectable with a clutch 14. The secondary mass 13 is selectively connected to an input shaft 16 of the transmission via the clutch 14. A hub 15 is coupled to a center portion of the primary mass 11 through a rivet (or a bolt) 17, and the secondary mass 13 is rotatably connected to the hub 15 through a pair of bushings 19a and 19b. Thus, the secondary mass 13 is rotatably connected to the primary mass 11.

Because the primary and secondary masses 11 and 13 are connected to each other through two bushings 19a and 19b, torsional stress acting on each of the bushings 19a and 19b is decreased so that distortion of the bushings 19a and 19b can be minimized.

As shown in FIGS. 1 and 2, the primary mass 11 can have a shape of a circular plate, although it will be appreciated by one of ordinary skill in the art that the masses can be of any appropriate shape.

The primary mass 11 defines a substantially ring-shaped chamber 25. A folded edge portion 21 is provided around the edge of the primary mass 11, and a cover 23 is coupled to the edge portion 21, thereby defining the ring-shaped chamber 25. One of ordinary skill in the art can appreciate that the ring-shaped chamber can be defined in any other way.

The ring-shaped chamber 25 may be divided into at least two portions. For example, the ring-shaped chamber can be divided into at least two portions by a first protrusion 27 formed on the primary mass 11 and/or a second protrusion 29 formed on the cover 23. Although the ring-shaped chamber 25 is divided into two portions in FIG. 2, it will be appreciated by one of ordinary skill in the art that the ring-shaped chamber 25 can be divided into more than two portions. The ring-shaped chamber 25 may be at least partially filled with lubrication oil.

The first and second protrusions 27 and 29 may be formed near a radial center portion of the ring-shaped chamber 25, so that lubrication oil passages 127 and 129 are formed on both sides of the first and second protrusions 27 and 29. Thus, the divided portions of the ring-shaped chamber 25 can be connected via the lubrication oil passages 127 and 129. The lubrication oil can move between the divided portions of the ring-shaped chamber 25 through the lubrication oil passages 127 and 129, so that lubrication oil can be prevented from gathering in one of the divided portions.

A ring gear 31 is formed in an outer circumference of the primary mass 11. The ring gear 31 is for connection with a start motor. A damping unit 33 is disposed in each divided portion of the ring-shaped chamber 25. The damping unit 33 is supported by the first and/or second protrusions 27 and 29. The damping unit 33 couples the primary and secondary masses 11 and 13 to each other in a rotationally elastic manner.

Hereinafter, the divided portions of the ring-shaped chamber 25 are simply referred to as the ring-shaped chamber.

Referring again to FIG. 1, the damping unit 33 includes a plurality of coil springs 35, 37, 39, and 41, and a friction member 43 that is disposed between the coil springs 35, 37, 39, and 41. The coil springs 35, 37, 39, and 41 are situated in series and disposed one after the other within the ring-shaped chamber 25. In an alternate embodiment, other suitable elastic members that can be compressed and provide an elastic force can be used in place of the coil springs, as will be appreciated by one of ordinary skill in the art. The damping unit 33 may further include a pair of end guides 49 and 51 that are slidably disposed within the ring-shaped chamber 25 and respectively support outer ends of the end coil springs 35 and 41 among the coil springs 35, 37, 39, and 41. The end guides 49 and 51 are supported by the first and second protrusions 27 and 29.

The damping member 43 has a direct effect on a damping characteristic of the damping unit 33, so it can be referred to as a hysteresis member. The plurality of coil springs 35, 37, 39, and 41 are situated in series between the end guides 49 and 51.

As shown in FIG. 1, a plurality of auxiliary coil springs 53, 55, 57, and 59 may be respectively disposed within the coil springs 35, 37, 39, and 41. Due to the auxiliary coil springs 53, 55, 57, and 59, sequential damping can be achieved.

The friction member 43 is slidably disposed between neighboring coil springs, e.g., 37 and 39, and is configured to be rubbed against at least one of an inner wall 118 and an outer wall 117 of the ring-shaped chamber 25 in response to compressions of the coil springs such that the friction force is generated in proportion to a relative rotation between the primary and secondary masses 11 and 13, and to a rotational speed thereof.

As shown in FIGS. 1 and 2, a drive plate 61 is fixedly coupled to the secondary mass 13, thereby rotating together with the secondary mass 13. Accordingly, the drive plate 61 can compress the damping unit 33 in response to a relative rotation between the primary and secondary masses 11 and 13.

Figure 3:
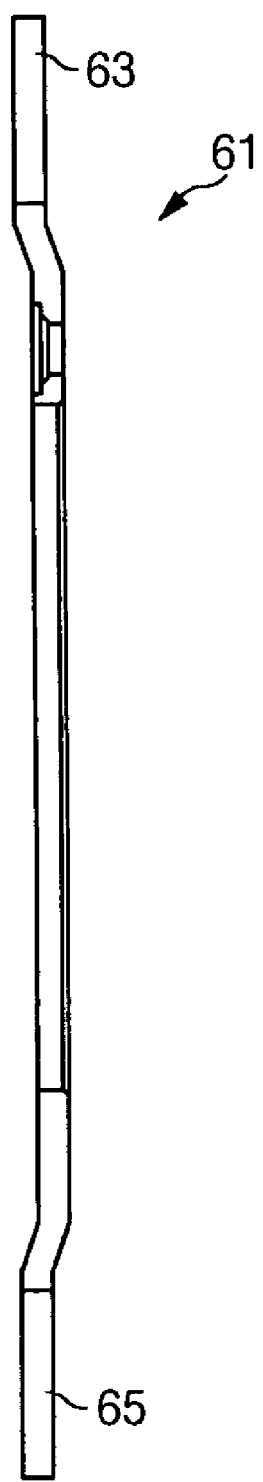
FIGS. 3 and 4 are side views of a drive plate of the torsional vibration damper according to an embodiment of the present invention.
Figure 4:
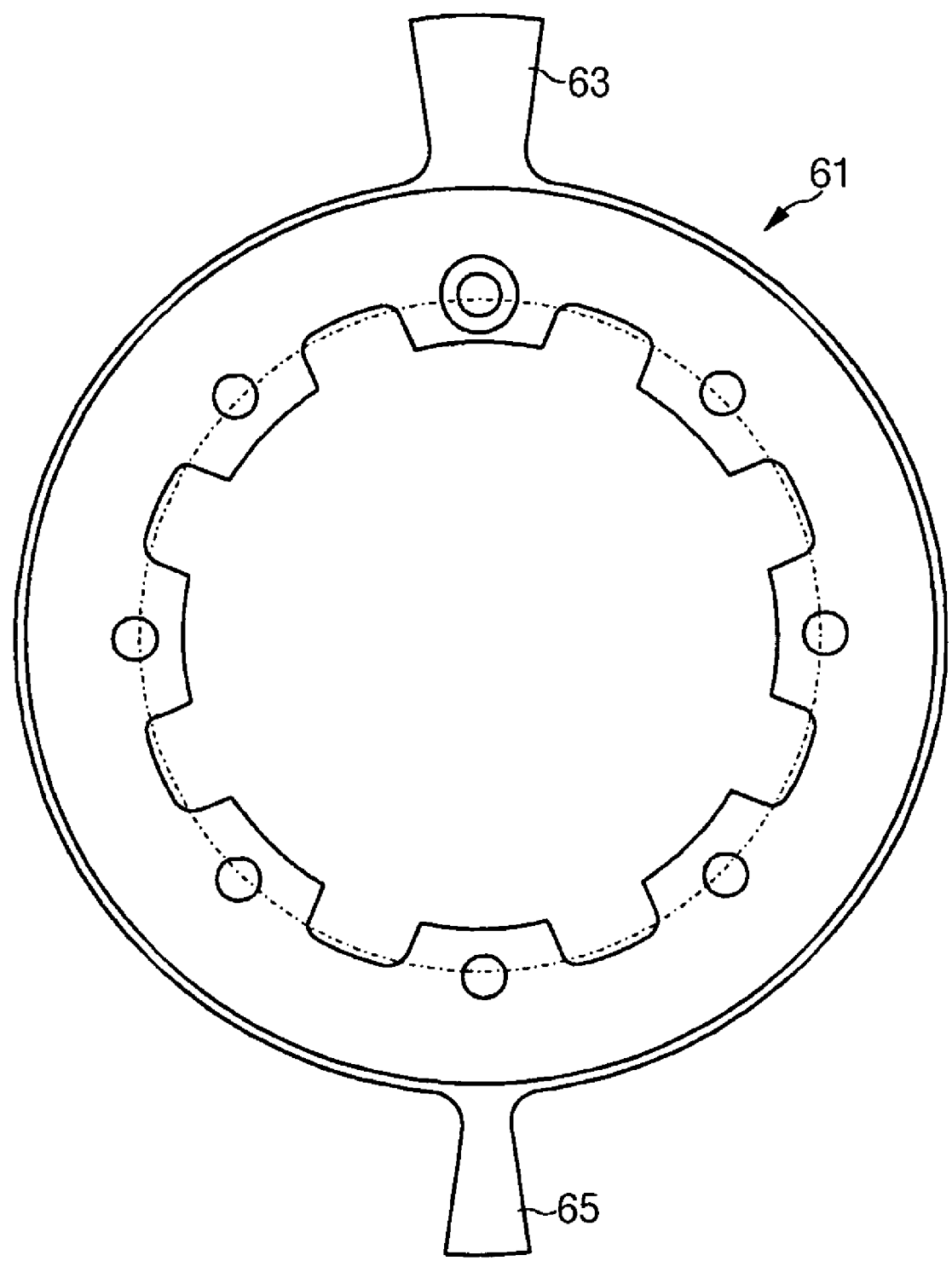

As shown in FIGS. 3 and 4, the drive plate 61 may have a ring shape, and first and second compression fins 63 and 65 may be oppositely provided on an outer circumference of the drive plate 61.

At least a portion of the compression fins 63 and 65 are positioned within the ring-shaped chamber 25, and have shapes and sizes that facilitate movement in the ring-shaped chamber 25. In addition, the compression fins 63 and 65 are configured to pass between the first and second protrusions 27 and 29 that divide the ring-shaped chamber 25.

When a power transmission does not occur in the torsional vibration damper 10, the compression fins 63 and 65 are positioned between the first and second protrusions 27 and 29. Meanwhile, while a power transmission occurs in the torsional vibration damper 10, the compression fins 63 and 65 move along the ring-shaped chamber 25 to compress the end guides 49 and 51.

For example, when the drive plate 61 rotates counter clockwise in FIG. 1 with respect to the primary mass 11, the first compression fin 63 compresses the end guide 49, and the second compression fin 65 compresses an end guide that is disposed within the other divided portion of the ring-shaped chamber 25. At this time, the other end guide 51 is supported by the first and second protrusions 27 and 29.

Therefore, the damping unit 33 is compressed by the primary mass 11 and the drive plate 61 in response to the relative rotation between the primary and secondary masses 11 and 13. Consequently, in response to the relative rotation between the primary and secondary masses 11 and 13, the plurality of coil springs 35, 37, 39, and 41 are also compressed. The friction member 43 slides in the ring-shaped chamber 25 as a result of the compression of the coil springs 35, 37, 39, and 41, and the friction member 43 is rubbed against the inner or outer walls 118 and 117 of the ring-shaped chamber 25 to generate a friction force.

Consequently, a damping is achieved by the compression of the coil springs 35, 37, 39, and 41 and the friction force generated by the movement of the friction member 43.

As shown in FIGS. 1 and 4, the first and second compression fins 63 and 65 have different widths, so that the damping units are sequentially compressed. That is, because the first compression fin 63, having a greater width, previously compresses one of the damping units and the second compression fin 65, having a lesser width, then compresses the other of the damping units, a two-step damping characteristic can be realized. However, it will be appreciated by one of ordinary skill in the art that a multiple step damping can be realized.

The damping units that are respectively disposed within the divided portions of the ring-shaped chamber 25 are sequentially compressed by the first and second compression fins 63 and 65, and this causes a multiple step damping, so that a torsional vibration can be effectively dampened.

Figure 5:
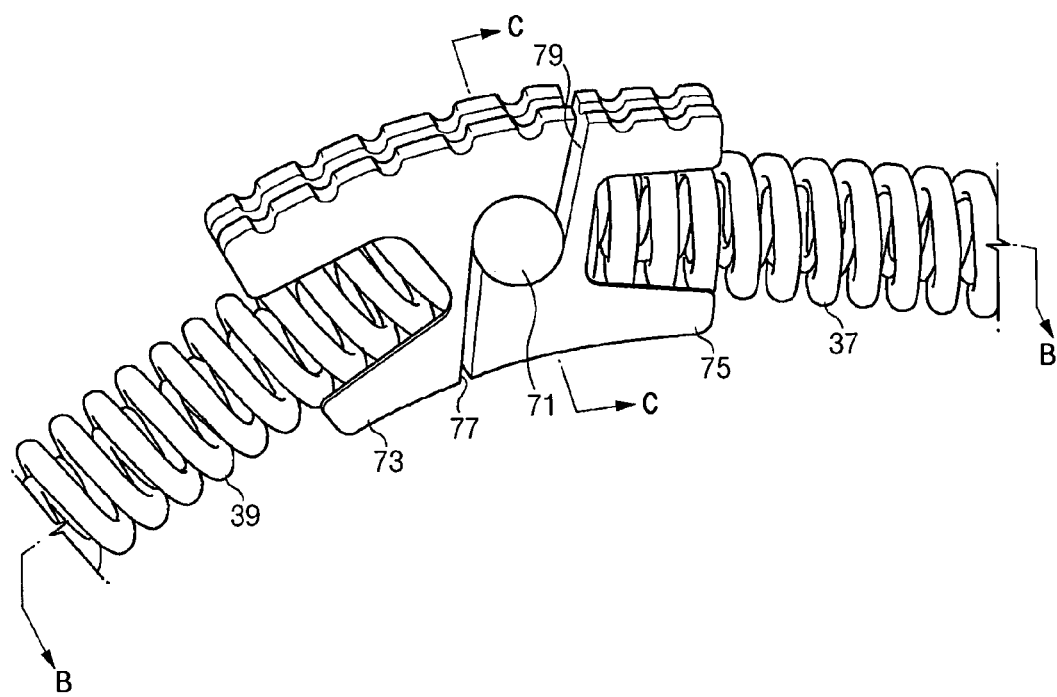
FIG. 5 is a perspective view of a friction member of the torsional vibration damper according to an embodiment of the present invention.
Figure 6:
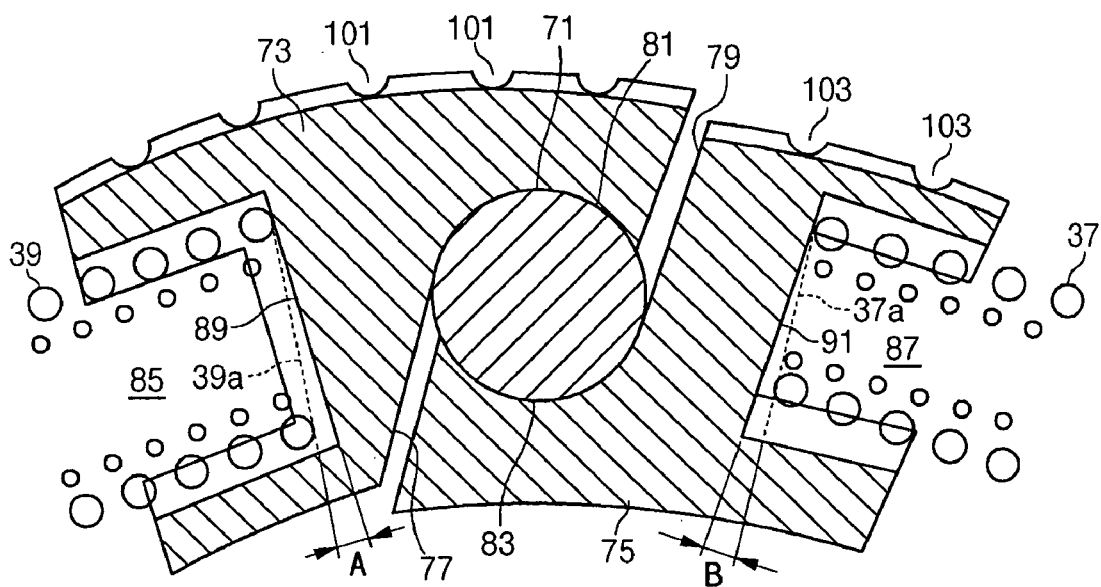
FIG. 6 is a sectional view along a line B-B in FIG. 5.

As shown in FIGS. 5 and 6, the friction member 43 includes a concentrated mass 71, an outer wedge-shaped friction guide 73, and an inner wedge-shaped friction guide 75. In the embodiment shown in FIG. 1, the number of the friction members is three, but it is evident that the number of friction members is not restricted thereto.

The outer wedge-shaped friction guide 73 and the inner wedge-shaped friction guide 75 are disposed between neighboring coil springs 39 and 37 to face each other. The concentrated mass 71 is disposed between the outer and inner wedge-shaped friction guides 73 and 75. The outer wedge-shaped friction guide 73 is elastically supported by the coil spring 39 toward the concentrated mass 71, and is provided with a first slanted surface 77 contacting the concentrated mass 71 at one end thereof. The inner wedge-shaped friction guide 75 is elastically supported by the coil spring 37 toward the concentrated mass 71, and is provided with a second slanted surface 79 contacting the concentrated mass 71 at one end thereof.

Figure 7:
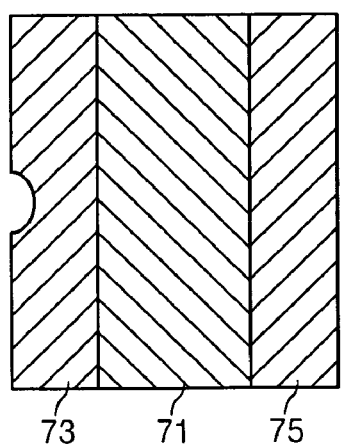
FIG. 7 is a sectional view along a line C-C in FIG. 5.

Referring to FIGS. 6 and 7, the concentrated mass 71 has a cylindrical shape, and the first and second slanted surfaces 77 and 79 contact the side surface of the cylindrical concentrated mass 71. Therefore, if the coil springs 39 and 37 are compressed in response to the relative rotation between the primary mass 11 and the secondary mass 13, the outer and inner wedge-shaped friction guides 73 and 75 approach to each other while maintaining linear contacts with the concentrated mass 71. During this time, the concentrated mass 71 undergoes a rolling while maintaining linear contacts with the first and second slanted surfaces 77 and 79. Consequently, in response to the relative rotation between the primary and secondary masses 11 and 13, the outer wedge-shaped friction guide 73 moves in an outwardly radial direction of the primary mass 11 while maintaining a linear contact with the concentrated mass 71, and the inner wedge-shaped friction guide 75 moves in an inwardly radial direction of the primary mass 11 while maintaining a linear contact with the concentrated mass 71.

Figure 8:
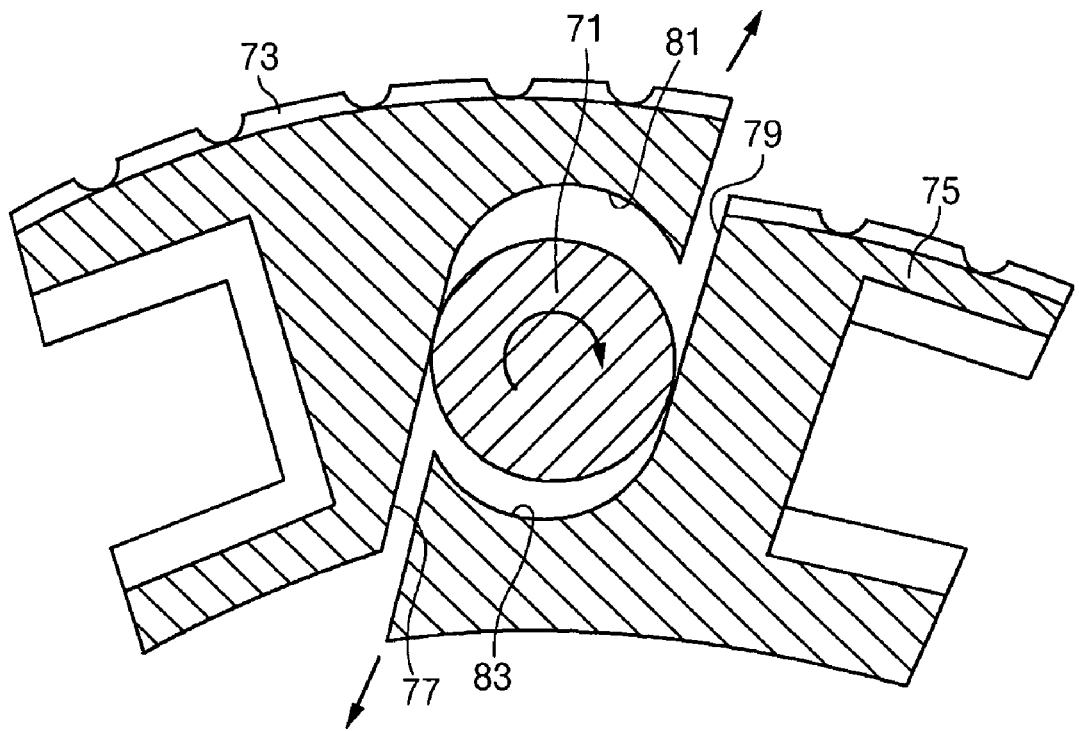
FIG. 8 is a schematic depiction of an operation of a friction member of the torsional vibration damper according to an embodiment of the present invention.

As shown in FIG. 8, when the coil springs 37 and 39 are compressed, the concentrated mass 71 rolls on the first slanted surface 77 of the outer wedge-shaped friction guide 73 and on the second slanted surface 79 of the inner wedge-shaped friction guide 75. Accordingly, the outer wedge-shaped friction guide 73 moves in an outwardly radial direction of the primary mass 11 along a direction as shown in an arrow, and the inner wedge-shaped friction guide 75 moves in an inwardly radial direction of the primary mass 11 along a direction as shown in an arrow.

Therefore, the outer wedge-shaped friction guide 73 is rubbed against the outer wall 117 of the ring-shaped chamber 25 to generate a friction force, and the inner wedge-shaped friction guide 75 is rubbed against the inner wall 118 of the ring-shaped chamber 25 to generate a friction force.

At this time, the friction between the outer and inner wedge-shaped friction guides 73 and 75 and the outer and inner walls 117 and 118 of the ring-shaped chamber 25 is proportional to an amount of the relative rotation between the primary and secondary masses 11 and 13. Therefore, the friction member 43 can generate a damping effect in proportion to an amount of the relative rotation between the primary and secondary masses 11 and 13.

Further, because the concentrated mass 71 maintains linear contacts with the first and second slanted surfaces 77 and 79, a power loss substantially decreases, when compared to a case in which outer and inner friction guides surface-contact to each other. Therefore, friction between the outer and inner wedge-shaped friction guides 73 and 75 and the primary mass 11 easily occurs.

As shown in FIGS. 6 and 8, a first curved surface 81 having a specific curvature may be formed at an outer end of the first slanted surface 77 of the outer wedge-shaped friction element 73, and a second curved surface 83 having a specific curvature may be formed at an inner end of the second slanted surface 79 of the inner wedge-shaped friction element 75. The concentrated mass 71 contacts the first and second slanted surfaces 77 and 79 between the first and second curved surfaces 81 and 83.

Because the cylindrical concentrated mass 71 is surrounded by the first and second curved surfaces 81 and 83, the concentrated mass 71 can be prevented from being separated from the outer and inner wedge-shaped friction guides 73 and 75.

The concentrated mass 71 is made of material having a density greater than a density of material of the outer and inner wedge-shaped friction guides. For example, the outer and inner wedge-shaped friction guides 73 and 75 may be made of plastic material, and the concentrated mass 71 may be made of metal. Because the friction member 43 includes the concentrated mass 71 that is made of material having a greater density, the friction member 43 can generate a friction force in proportion to a centrifugal force, i.e., a rotational speed.

As shown in FIG. 6, a first coil spring receiving hole 85 into which a portion of the coil spring 39 is inserted is formed at one end of the outer wedge-shaped friction guide 73, and a second coil spring receiving hole 87 into which a portion of the coil spring 37 is inserted is formed at one end of the inner wedge-shaped friction guide 75.

A bottom surface 89 of the first coil spring receiving hole 85 may be slanted by a predetermined angle A with respect to an end surface 39a of the coil spring 39, and a bottom surface 91 of the second coil spring receiving hole 87 may be slanted by a predetermined angle B with respect to an end surface 37a of the coil spring 37.

The bottom surfaces 89 and 91 of the first and second coil spring receiving holes 85 and 87 are slanted such that outer end portions of the end surfaces 39a and 37a of the coil springs 39 and 37 contact the bottom surfaces 89 and 91, and inner end portions of the end surfaces 39a and 37a of the coil springs 39 and 37 do not contact the bottom surfaces 89 and 91, in a state in which there is no relative rotation between the primary and secondary masses 11 and 13. Under these configurations, when the coil springs 39 and 37 are compressed, the coil springs 39 and 37 are bent such that a center portion thereof approaches a center of the primary mass 11. Thus, such bending of the coil springs 39 and 37 compensates an outward bending of the coil springs 39 and 37 due to a centrifugal force while rotating. Therefore, the coil springs 39 and 37 can be prevented from being bent by a centrifugal force while rotating.

Figure 9:
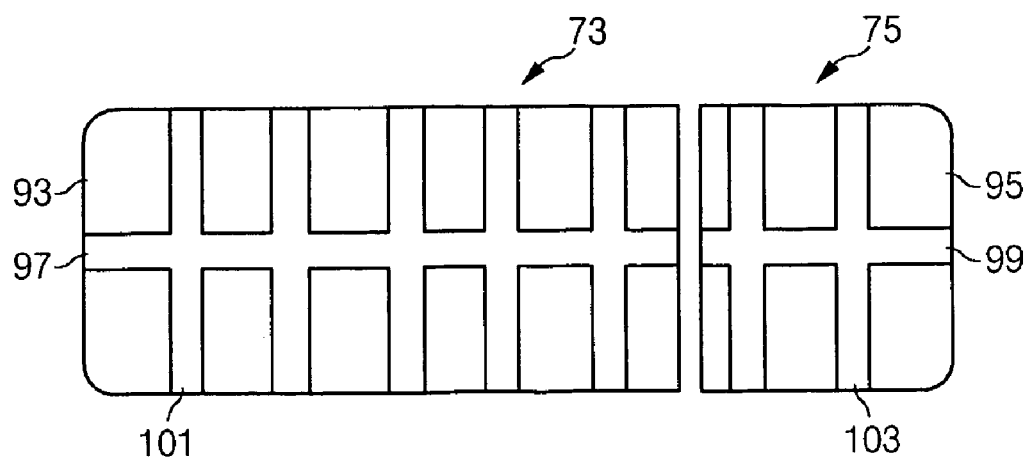
FIG. 9 is a plan view of outer surfaces of an inner wedge-shaped friction guide and an outer wedge-shaped friction guide of the torsional vibration damper according to an embodiment of the present invention.

As shown in FIG. 9, at least one of first grooves 97 and 99 and at least one of second grooves 101 and 103 are formed on at least one of the outer surfaces 93 and 95 of the outer and inner wedge-shaped friction guides 73 and 75.

The first grooves 97 and 99 are formed in a circumferential direction of the ring-shaped chamber 25, and the second grooves 101 and 103 are formed in a direction substantially perpendicular to the circumferential direction of the ring-shaped chamber 25.

The first grooves 97 and 99 provide a lubrication oil passage, and the second grooves 101 and 103 scrape a lubrication oil film existing on the outer wall 117 of the ring-shaped chamber 25 so that a thickness of the lubrication oil film can be maintained to be substantially constant.

Figure 10:
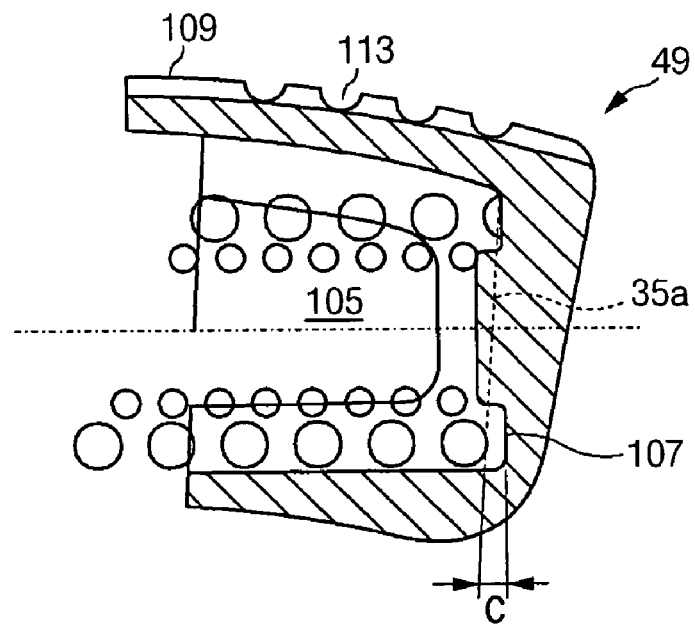
FIG. 10 is a partial section view of an end guide of the torsional vibration damper according to an embodiment of the present invention.

As shown in FIG. 10, a coil spring receiving hole 105 into which at least a portion of the coil spring is inserted is formed at one end of the end guide 49. A bottom surface 107 of the coil spring receiving hole 105 is slanted by a predetermined angel C with respect to an end surface 35a of the coil spring 35.

The bottom surface 107 of the coil spring receiving hole 105 is slanted such that an outer end portion of the end surface 35a of the coil spring 35 contacts the bottom surface 107 and an inner end portion of the end surface 35a of the coil spring 35 does not contact the bottom surface 107 in a state in which there is no relative rotation between the primary and secondary masses 11 and 13. Under these configurations, when the coil spring 35 is compressed, the coil spring 35 is bent such that a center portion thereof approaches a center of the primary mass 11. Thus, such bending of the coil spring 35 compensates an outward bending of the coil spring 35 due to a centrifugal force while rotating. Therefore, the coil spring 35 can be prevented from being bent by a centrifugal force while rotating.

Figure 11:
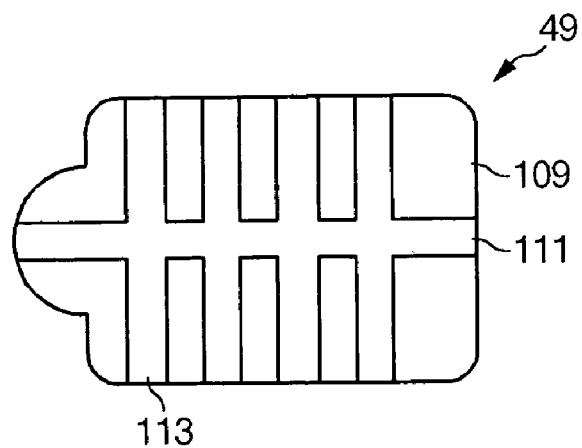
FIG. 11 is a plan view of an outer surface of an end guide of the torsional vibration damper according to an embodiment of the present invention.

As shown in FIG. 11, a first groove 111 and at least one second groove 113 are formed on an outer surface 109 of the end guide 49. The first groove 111 is formed in a circumferential direction of the ring-shaped chamber 25, and the second groove 113 is formed in a direction substantially perpendicular to the circumferential direction of the ring-shaped chamber 25.

The first groove 111 provides a lubrication oil passage, and the second groove 113 scrapes a lubrication oil film existing on the outer wall 117 of the ring-shaped chamber 25 so that a thickness of the lubrication oil film can be maintained to be substantially constant.

Figure 12:
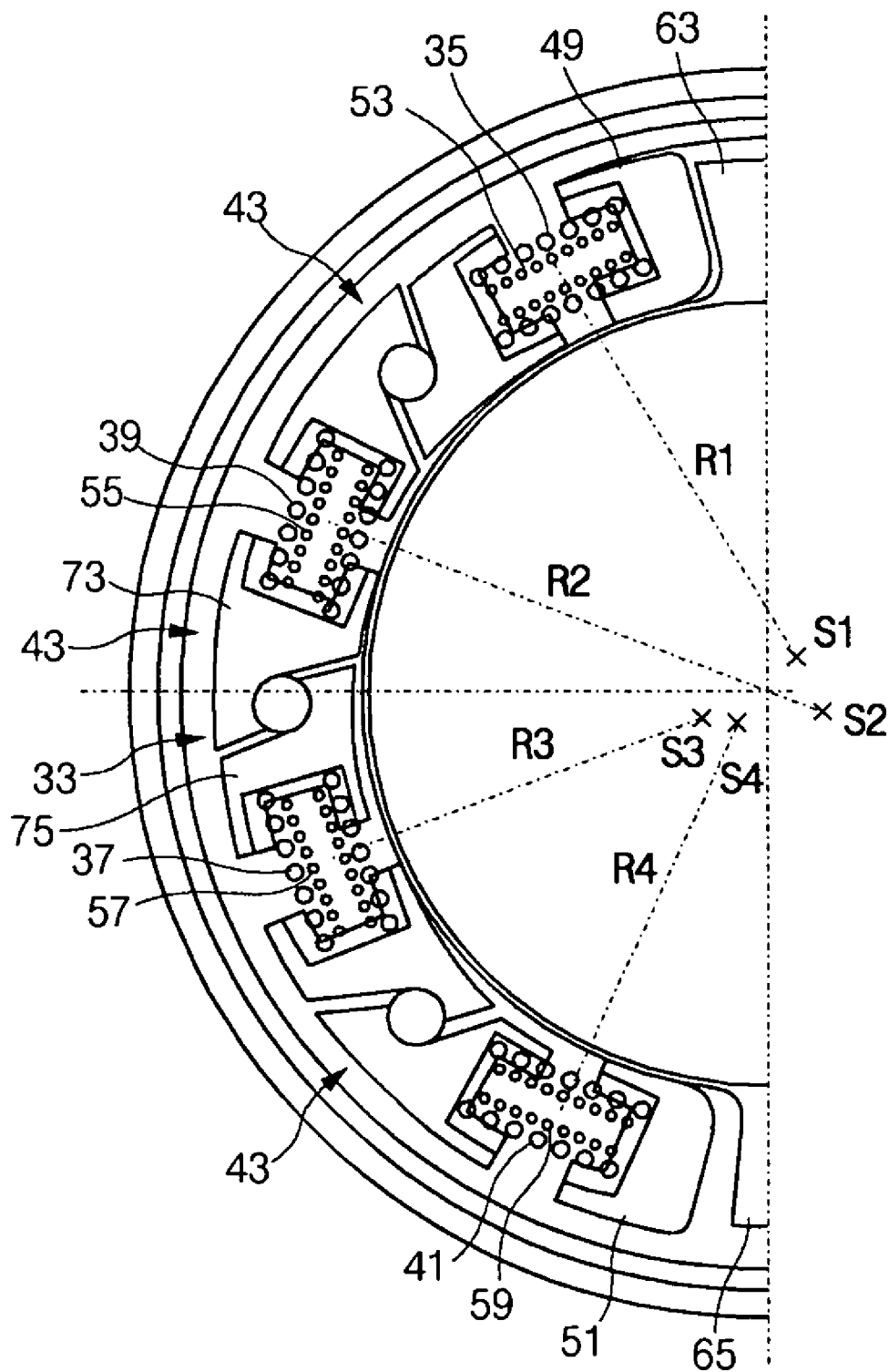
FIG. 12 is a partial side view illustrating operating radii of coil springs of the torsional vibration damper according to an embodiment of the present invention.

As shown in FIG. 12, a mean operating radius of the outer wedge-shaped friction guide 73 is greater than that of the inner wedge-shaped friction guide 75. Operating centers S1, S2, S3, and S4 and mean operating radii R1, R2, R3, and R4 of the coil springs 35, 37, 39, and 41 are shown in FIG. 12. R2 is greatest among the four mean operating radii, and R3 is smallest. R4 is greater than R3. Because the mean operating radii of the coil springs supporting the outer and inner wedge-shaped friction guides differ from each other, the coil springs are not compressed at the same time so that sequential damping can be achieved.

While this invention has been described in connection with what is presently considered to be the most practical exemplary embodiments, it is to be understood that the invention is not limited to the disclosed embodiments, but, on the contrary, is intended to cover various modifications and equivalent arrangements included within the spirit and scope of the appended claims.

According to an embodiment of the present invention, a damping in proportion to a relative rotation between the primary and secondary masses as well as to a rotational speed thereof can be obtained.

What is claimed is:

1. A torsional vibration damper, comprising:
    a primary mass adapted to be coupled to an engine crankshaft for rotation about a rotational axis of the engine crankshaft, the primary mass defining a substantially ring-shaped chamber that is divided into at least two portions;
    a secondary mass relatively rotatably connected to the primary mass and connectable with a clutch; and
    a damping unit for coupling the primary and secondary masses to each other in a rotationally elastic manner, wherein the damping unit comprises:
        a plurality of coil springs situated in series and disposed one after the other within the divided portions of the ring-shaped chamber,
        a pair of end guides slidably disposed within each divided portion of the ring-shaped chamber and supporting outer ends of the coil springs among the plurality of elastic members, and
        a friction member slidably disposed between neighboring coil springs and configured to be rubbed against at least one of an inner wall and an outer wall of the ring-shaped chamber in response to compressions of the coil springs such that a friction force is generated in proportion to a relative rotation between the primary and secondary masses as well as to a rotational speed thereof, wherein the friction member comprises:
            a concentrated mass;
            an outer wedge-shaped friction guide elastically supported by one of the neighboring coil springs toward the concentrated mass and provided with a first slanted surface contacting the concentrated mass at one end thereof; and
            an inner wedge-shaped friction guide elastically supported by the other of the neighboring coil springs toward the concentrated mass and provided with a second slanted surface contacting the concentrated mass at one end thereof;
            wherein the concentrated mass is disposed such that the outer wedge-shaped friction guide moves radially outward and the inner wedge-shaped friction guide moves radially inward.

2. The torsional vibration damper of claim 1, wherein the concentrated mass has a cylindrical shape such that, in response to compressions of the coil springs, the outer wedge-shaped friction guide moves in an outwardly radial direction of the primary mass while maintaining a linear contact with the concentrated mass, and the inner wedge-shaped friction guide moves in an inwardly radial direction of the primary mass while maintaining a linear contact with the concentrated mass.

3. The torsional vibration damper of claim 1, wherein the outer and inner wedge-shaped friction guides are provided respectively with a first curved surface and a second curved surface, and the concentrated mass is disposed between the first and second curved surfaces to contact the first and second slanted surfaces.

4. The torsional vibration damper of claim 3, wherein the first curved surface is provided at an outer end of the outer wedge-shaped friction guide and the second curved surface is provided at an inner end of the inner wedge-shaped friction guide.

5. The torsional vibration damper of claim 1, wherein the concentrated mass is made of material having a density greater than a density of material of the outer and inner wedge-shaped friction guides.

6. The torsional vibration damper of claim 5, wherein the outer and inner wedge-shaped friction guides are made of plastic material and the concentrated mass is made of metal.

7. The torsional vibration damper of claim 1, wherein a mean operating radius of the outer wedge-shaped friction guide is greater than a mean operating radius of the inner wedge-shaped friction guide.

8. The torsional vibration damper of claim 1, wherein a first groove is formed in a circumferential direction of the ring-shaped chamber on at least one of the outer surfaces of the outer and inner wedge-shaped friction guides.

9. The torsional vibration damper of claim 8, wherein a second groove is formed in a direction substantially perpendicular to the circumferential direction of the ring-shaped chamber on at least one of the outer surfaces of the outer and inner wedge-shaped friction guides.

10. The torsional vibration damper of claim 1, wherein a lubrication oil passage is formed between the divided portions of the ring-shaped chamber.

11. The torsional vibration damper of claim 1, wherein a first groove is formed in a circumferential direction of the ring-shaped chamber on an outer surface of the end guide.

12. The torsional vibration damper of claim 11, wherein a second groove is formed in a direction substantially perpendicular to the circumferential direction of the ring-shaped chamber on the outer surface of the end guide.

13. The torsional vibration damper of claim 1, further comprising a drive plate that is coupled to the secondary mass and configured to compress the damping unit when a relative rotation between the primary and secondary masses occurs.

14. The torsional vibration damper of claim 13, wherein a plurality of compression fins are formed on an outer circumference of the drive plate, and wherein widths of the compression fins differ from each other.

* * * * *